(12) United States Patent
Julian et al.

(10) Patent No.: US 8,527,075 B2
(45) Date of Patent: Sep. 3, 2013

(54) METHOD AND APPARATUS FOR TRANSMIT AND RECEIVE CLOCK MISMATCH COMPENSATION

(75) Inventors: David Jonathan Julian, San Diego, CA (US); Harinath Garudadri, San Diego, CA (US); Somdeb Majumdar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1135 days.

(21) Appl. No.: 12/261,560

(22) Filed: Oct. 30, 2008

(65) Prior Publication Data

US 2010/0023142 A1 Jan. 28, 2010

Related U.S. Application Data

(60) Provisional application No. 61/083,466, filed on Jul. 24, 2008.

(51) Int. Cl.
*G06F 17/00* (2006.01)
*G06F 3/00* (2006.01)
*G06F 5/00* (2006.01)

(52) U.S. Cl.
USPC ................ 700/94; 710/52; 710/65; 710/66

(58) Field of Classification Search
USPC .................. 700/94; 710/52, 54, 65, 66, 68
See application file for complete search history.

(56) References Cited

U.S. PATENT DOCUMENTS

| | | | |
|---|---|---|---|
| 6,169,747 B1 * | 1/2001 | Sartain et al. | 370/468 |
| 6,252,919 B1 | 6/2001 | Lin | |
| 6,678,243 B2 | 1/2004 | Sartain et al. | |
| 7,426,251 B1 * | 9/2008 | Huang | 375/355 |
| 2009/0259671 A1 | 10/2009 | Garudadri et al. | |
| 2009/0259672 A1 | 10/2009 | Garudadri et al. | |
| 2010/0080331 A1 | 4/2010 | Garudadri et al. | |

FOREIGN PATENT DOCUMENTS

| | | |
|---|---|---|
| EP | 0921666 | 6/1999 |
| EP | 1096715 | 5/2001 |
| JP | 2000122681 A | 4/2000 |
| JP | 2001-177507 * | 6/2001 |
| JP | 2004264497 A | 9/2004 |
| WO | 9959279 A1 | 11/1999 |
| WO | 0193490 | 12/2001 |
| WO | 2008006080 | 1/2008 |

OTHER PUBLICATIONS

International Search Report—PCT/US09/032862, International Search Authority—European Patent Office—May 8, 2009.
Written Opinion—PCT/US2009/032862, International Search Authority—European Patent Office—May 8, 2009.
Taiwan Search Report—TW098103404—TIPO—Apr. 19, 2013.

* cited by examiner

*Primary Examiner* — Jesse Elbin
(74) *Attorney, Agent, or Firm* — Paul S. Holdaway

(57) ABSTRACT

An apparatus and method for processing signals are disclosed. The apparatus may include an oversampling circuit configured to receive a plurality of audio signal samples, the oversampling circuit being further configured to replicate each of the audio signal samples n times, wherein n is variable.

39 Claims, 4 Drawing Sheets

METHOD AND APPARATUS FOR TRANSMIT AND RECEIVE CLOCK MISMATCH COMPENSATION

CLAIM OF PRIORITY UNDER 35 U.S.C. §119

The present Application for patent claims priority to Provisional Application No. 61/083,466 entitled "METHOD TO COMPENSATE FOR TX/RX CLOCK MISMATCH" filed Jul. 24, 2008, and assigned to the assignee hereof and hereby expressly incorporated by reference herein.

BACKGROUND

The present disclosure relates generally to communication systems, and more particularly, to concepts and techniques for compensating for clock mismatch.

Peer-to-peer networks are commonly used for connecting wireless nodes via adhoc connections. These networks differ from the traditional client-server model where communications are usually with a central server. A peer-to-peer network has only equal peer nodes that communicate directly with one another. Such networks are useful for many purposes. A peer-to-peer network may be used, for example, as a consumer electronic wire replacement system for short range or indoor applications. These networks are sometimes referred to as Wireless Personal Area Networks (WPAN) and are useful for efficiently transferring video, audio, voice, text, and other media between wireless nodes over a short distance. A WPAN may provide connectivity for nodes in a home or a small office or may be used to provide connectivity for nodes carried by a person. In a typical scenario, a WPAN may provide connectivity for nodes within a range on the order of tens of meters.

In a communication system between two nodes, there may sometimes exist mismatches between a transmitting node's clock and a receiving node's clock. Here, the transmitting node may transmit data synchronized to the transmit clock and the receiving node may consume data synchronized to the receive clock. Depending on the receive clock leading or lagging the transmit clock, a buffer underflow or buffer overflow condition may occur in the receiving node. This may lead to artifacts (e.g., audio distortions for speech and audio services) or loss of communication in a worse case.

One technique for addressing such a problem is making the transmit clock available to the receiving node and using the transmit clock to consume data. In practice, such a technique could be relatively complex if a node is configured to receive data from multiple transmitting nodes and also configured to simultaneously transmit data to multiple nodes. This additional complexity may increase the hardware cost and, if applicable, reduce the battery life of the node.

Another approach is to modify the receive buffer using dynamic time-warping. Time warping solutions modify the size of the buffer by upsampling or downsampling. These approaches involve spectral domain processing or autocorrelation methods in the time domain. These approaches are computationally expensive and result in additional delays that are not practical in some applications.

Consequently, there exists a need for a low complexity and low cost techniques to compensate for transmit and receive clock mismatch between communication nodes.

SUMMARY

According to an aspect of the disclosure, an apparatus for processing signals includes an oversampling circuit configured to receive a plurality of audio signal samples, the oversampling circuit being further configured to replicate each of the audio signal samples n times, wherein n is variable.

According to another aspect of the disclosure, a method for processing signals includes receiving a plurality of audio signal samples at a circuit, and replicating each of the audio signal samples n times at the circuit, wherein n is variable.

According to a further aspect of the disclosure, an apparatus for processing signals includes receiving means for receiving a plurality of audio signal samples, and oversampling means for replicating each of the audio signal samples n times, wherein n is variable.

According to yet a further aspect of the disclosure, a computer program product for processing signals includes a computer-readable medium comprising instructions executable to receive a plurality of audio signal samples, and replicate each of the audio signal samples n times, wherein n is variable.

According to another aspect of the disclosure, a headset includes an oversampling circuit configured to receive a plurality of audio signal samples, the oversampling circuit being further configured to replicate each of the audio signal samples n times, wherein n is variable, and a transducer configured to provide an audible output based on the audio signal samples.

According to yet another aspect of the disclosure, a watch includes an oversampling circuit configured to receive a plurality of audio signal samples, the oversampling circuit being further configured to replicate each of the audio signal samples n times, wherein n is variable, and a display configured to provide a visual output based on the audio signal samples.

According to yet a further aspect of the disclosure, a medical monitor includes a receiver configured to receive an audio signal generated by a sensor, and an audio circuit configured to reduce the audio artifacts during at least a portion of a time period as a function of energy level of the audio signal during that time period.

It is understood that other aspects of the invention will become readily apparent to those skilled in the art from the following detailed description, wherein it is shown and described only various aspects of the invention by way of illustration. As will be realized, the invention is capable of other and different aspects and its several details are capable of modification in various other respects, all without departing from the scope of the invention. Accordingly, the drawings and detailed description are to be regarded as illustrative in nature and not as restrictive.

BRIEF DESCRIPTION OF THE DRAWINGS

These and other sample aspects of the disclosure will be described in the detailed description and the appended claims that follow, and in the accompanying drawings, wherein:

Figure 1:
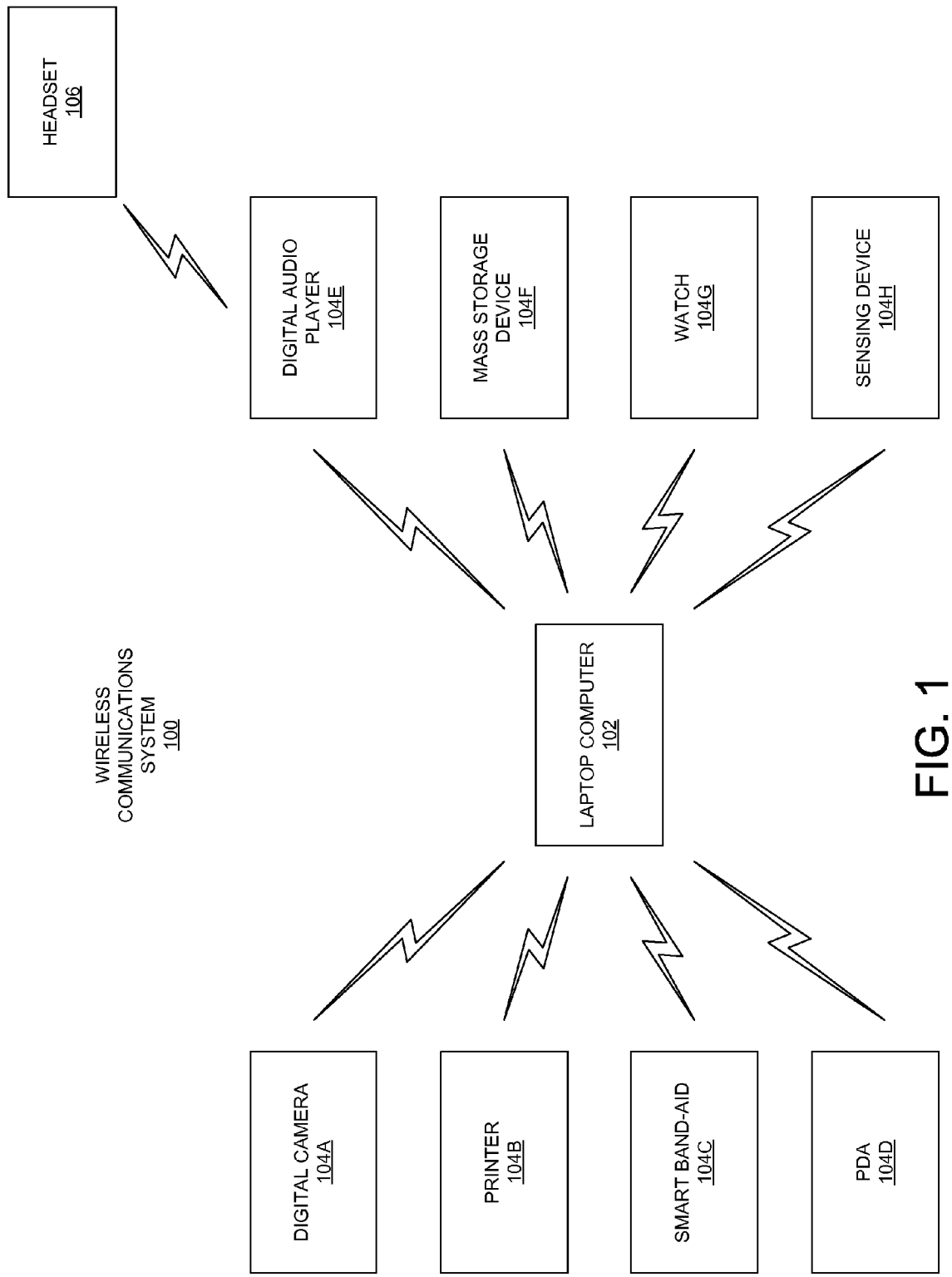
FIG. 1 is a conceptual diagram illustrating an example of a wireless communications system.

In accordance with common practice the various features illustrated in the drawings may be simplified for clarity. Thus, the drawings may not depict all of the components of a given apparatus (e.g., node) or method. In addition, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect may comprise one or more elements of a claim.

Several aspects of a receiver will now be presented. The receiver may be part of a mobile or fixed node, such as a phone (e.g., cellular phone), a personal digital assistant (PDA), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), a medical monitor that may receive data from the medical sensing device, an environment sensing device (e.g., a tire pressure monitor), a computer, a point-of-sale device, an entertainment device, a hearing aid, a set-top box, or any other suitable device. The node may include various components in addition to the receiver. By way of example, a wireless headset may include a transducer configured to provide an audio output to a user, a wireless watch may include a user interface configured to provide an indication to a user, and a wireless sensing device may include a sensor configured to provide an audio output to a user.

The receiver may also be part of an access device (e.g., a Wi-Fi access point) that provides backhaul services to other nodes. Such an access device may provide, by way of example, connectivity to another network (e.g., a wide area network such as the Internet or a cellular network) via a wired or wireless communication link.

In many of the applications described above, the receiver may be part of a node that transmits as well as receives. Such a node would therefore require a transmitter, which may be a separate component or integrated with the receiver into a single component known as a "transceiver." As those skilled in the art will readily appreciate, the various concepts described throughout this disclosure are applicable to any suitable receiver function, regardless of whether the receiver is a stand-alone node, integrated into a transceiver, or part of a node in a wireless communications system.

In the following detailed description, various aspects of a receiver will be described for reducing or removing signal artifacts (e.g., audio artifacts) from received signals. Some aspects of the receiver will be described in the context of a WPAN supporting Ultra-Wideband (UWB), but as those skilled in the art will readily appreciate that the various aspects presented throughout this disclosure are likewise applicable to receivers for other radio technologies including Bluetooth, WiMax, and Wi-Fi, just to name a few. These aspects may also be extended to wired technologies including, by way of example, cable modem, Digital Subscriber Line, (DSL), Ethernet, and any other suitable communications technology.

An example of a UWB WPAN with wireless nodes that may benefit by incorporating various aspects of a receiver presented throughout this disclosure is shown in FIG. 1. UWB is a common technology for high speed short range communications (e.g., home and office networking applications) as well as low speed long range communications. UWB is defined as any radio technology having a spectrum that occupies a bandwidth greater than 20 percent of the center frequency, or a bandwidth of at least 500 MHz. Two radio technologies have recently emerged to support UWB. One is based on Impulse Radio techniques extended to direct sequence spread spectrum. The other radio technology is based on Orthogonal Frequency Division Multiplexing (OFDM).

The WPAN 100 is shown with a laptop computer 102 in communication with various other wireless nodes 104. In this example, the computer 102 may receive digital photos from a digital camera 104A, send documents to a printer 104B for printing, communicate with a smart band-aid 104C, synch-up with e-mail on a Personal Digital Assistant (PDA) 104D, transfer music files to a digital audio player (e.g., MP3 player) 104E, back up data and files to a mass storage device 104F, set the time on a watch 104G, and receive data from a sensing device 104H (e.g., a medical device such as a biometric sensor, a heart rate monitor, a pedometer, an EKG device, etc.). Also shown is a headset 106 (e.g., headphones, earpiece, etc.) that receives audio from the digital audio player 104E.

In one configuration of the WPAN 100, the computer 102 provides an access point to a Wide Area Network (WAN) (i.e., a wireless network covering a regional, nationwide, or even a global region). One common example of a WAN is the Internet. Another example of a WAN is a cellular network that supports CDMA2000, a telecommunications standard that uses Code Division Multiple Access (CDMA) to send voice, data, and signaling between mobile subscribers. Another example of a WWAN is a cellular network that provides broadband Internet access to mobile subscribers, such as Evolution-Data Optimized (EV-DO) or Ultra Mobile Broadband (UMB), both of which are part of the CDMA2000 family of air interface standards. Alternatively, or in addition to, the computer 102 may have a UWB connection to an Ethernet modem, or some other interface to a Local Area Network (LAN) (i.e., a network generally covering tens to a few hundred meters in homes, offices buildings, coffee shops, transportation hubs, hotels, etc.).

Figure 2:
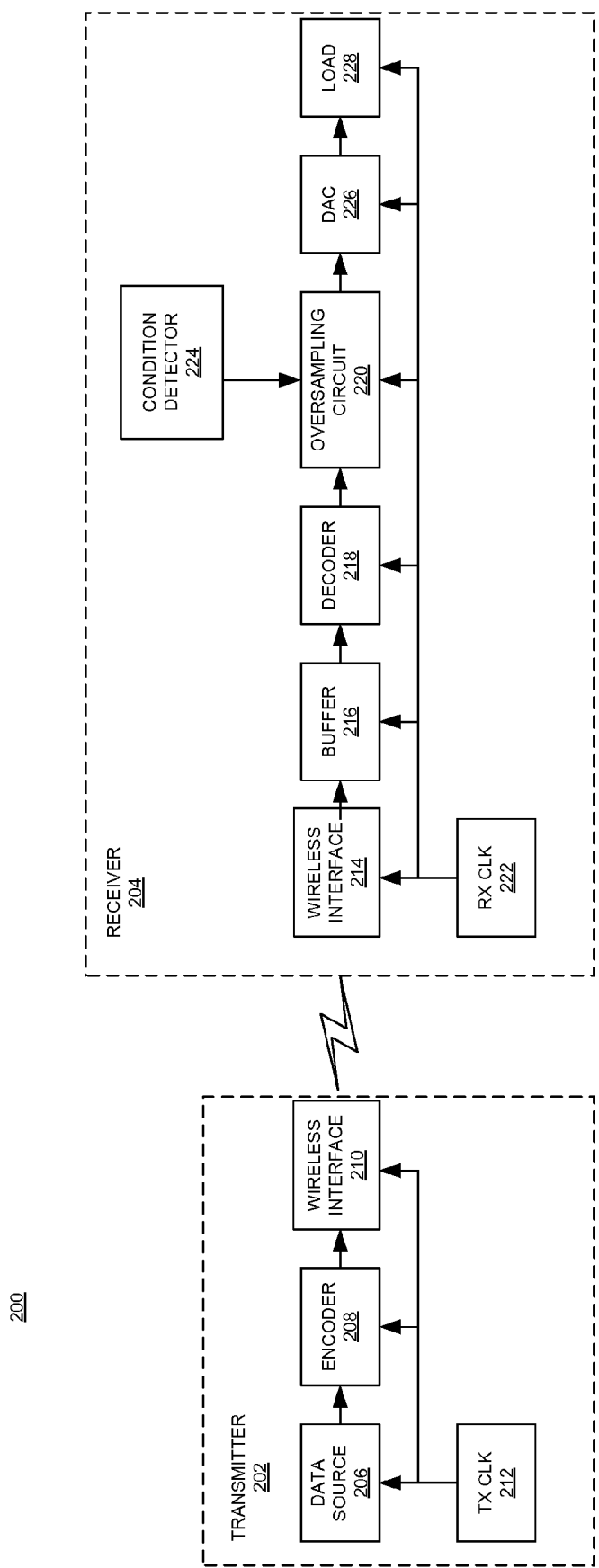
FIG. 2 is a schematic block diagram illustrating an example of a receiver.

Various aspects of a receiver will now be presented with reference to FIG. 2. As discussed earlier, these aspects may be well suited for wireless nodes in a UWB WPAN such as the one described in connection with FIG. 1. However, as those skilled in the art will readily appreciate, these aspects may be extended to receivers for other radio and wired technologies.

FIG. 2 is a schematic block diagram illustrating an example of a transmitter 202 and a receiver 204 in a communications system 200. The transmitter 202 is shown with a data source 206, encoder 208, and a wireless interface 210, all clocked by a TX clock 212.

The encoder 208 receives data from the data source 206. The data may be audio, video, text, and/or other types of multimedia content. In the case of audio, the encoder 208 may be configured to encode the audio signal to a particular audio file format or streaming audio format. In one example of a transmitter 202, the encoder 208 may encode the audio signal using a backward adaptive gain ranged algorithm; however, the encoder 208 may be configured to provide other encoding schemes.

The encoded audio signal may be provided to a wireless interface receiver 210 that implements the physical (PHY) layer and the Medium Access Control (MAC) layer. The PHY layer implements all the physical and electrical specifications to interface the transmitter 202 to the wireless medium. More specifically, the PHY layer is responsible for modulating a carrier with the encoded audio signal, as well as providing other processing functions such as forward error correction (e.g., Turbo coding). The MAC layer manages the data that is transmitted across the PHY layer making it possible for the transmitter to communicate with several nodes.

At the receiver 204, the modulated carrier signal is processed by a wireless interface 214. The wireless interface 214 is similar to that described in connection with transmitter 202, implementing both the PHY and MAC layers. The PHY layer, which implements all the physical and electrical specifications to interface the receiver to the wireless medium, demodulates the carrier to recover an audio signal and provides other processing functions such as timing and frequency estimation, channel estimation, and forward error correction (e.g., Turbo decoding). The PHY layer may also provide analog-to-digital conversion providing "encoded audio signal samples" at the output. The MAC layer manages the audio content that is received across the PHY layer making it possible for several nodes to communicate with the receiver 204. The implementation of the wireless interface 204 is well within the capabilities of one skilled in the art, and therefore, will not be described any further.

The encoded audio signal samples output from the wireless interface 214 are provided to a buffer 216 prior to decoding. The buffer 216 temporarily stores the encoded audio signal samples to attempt to compensate for a difference between respective data flow rates of the transmitter 202 and the receiver 204. The buffer 210 collects the encoded audio signal samples and provides them to a decoder 218 to reconstruct the audio signal from the encoded transmission recovered by the wireless interface 214. The decoder 218 may be configured to reconstruct an audio signal encoded with a backward adaptive gain ranged algorithm to support the configuration of the transmitter 202 described earlier, or may be configured to handle other encoding schemes. Those skilled in the art will be readily able to implement the appropriate decoder 218 for any particular application. The decoder 218 may be a stand-alone component as shown in FIG. 2, or integrated into an audio codec in the case where the receiver 204 is part of a node that transmits as well as receives.

The output from the decoder 218 may be provided to an oversampling circuit 220. The oversampling circuit 220 is configured to upsample the audio signal samples at a frequency much greater than the Nyquist frequency (two times the bandwidth of the audio signal). This process tends to reduce aliasing, which might otherwise distort the audio signal.

The oversampling circuit 220 may upsample the audio signal samples by replicating each audio signal sample N times. This upsampling ratio N is variable and may be adjusted based on the condition of the buffer 216. In particular, depending on whether the RX clock 222 leads or lags the TX clock 212, the buffer 216 may enter either an underflow condition or an overflow condition, respectively. In these instances, the buffer 216 may signal a condition detector 224 informing it of the particular condition. The condition detector 224 may then provide either an insert flag instructing the oversampling circuit 220 to replicate additional samples or a remove flag instructing the oversampling circuit 220 to replicate fewer signal samples. The oversampling circuit 220 varies the number of replicated samples by varying the upsampling ratio N.

For example, if the oversampling circuit 216 receives the insert flag, it will replicate each audio sample N=(R+k) times, where R is the default fixed upsampling ratio, and k represents the additional replicated samples. It should be noted that R/k=p, which is an integer. The replication may be repeated p times for consecutive or non-consecutive audio signal samples. This ensures that at the end of p replications, R upsamples will have been added.

Alternatively, if the oversampling circuit 216 receives the remove flag, it will replicate each audio signal sample N=(R−k) times, where k now represents the replicated samples that will be removed. Again, R/k=p, which is an integer. The replication may likewise be repeated p times for consecutive or non-consecutive audio signal samples. This ensures that at the end of p replications, R upsamples will have been removed.

In the case, that the buffer 216 is in neither the overflow nor the underflow condition, the oversampling circuit 220 replicates the audio signal samples at the default fixed upsampling ratio R.

The output from the oversampling circuit 220 may be provided to a digital-to-analog converter (DAC) 226, which converts the upsampled audio to an analog signal in order to drive the load 228 (e.g., a speaker). The DAC 226 may convert the upsampled audio at a clock frequency that is R times faster than the frequency of the RX clock 222. In this manner, the receiver 204 can remove or add an equivalent of one whole audio signal sample at the frequency of the RX clock 222. The removal or addition of the upsamples, however, is spread over p audio signal samples. This may result in a distortion level lower than when removing or adding whole audio signal sample at an output of the decoder 218.

Furthermore, because the addition of upsamples is carried out at the oversampling circuit 220 and the added upsamples is identical to at least one of its neighbors, there is little or no signal quality loss. Similarly, because the removed upsamples are identical to at least one of its neighbors, there is little or no loss in information resulting from the removal of the upsamples. Any residual artifacts may be smoothed by a low-pass filter (not shown), which may be located within the DAC 226.

Figure 3:
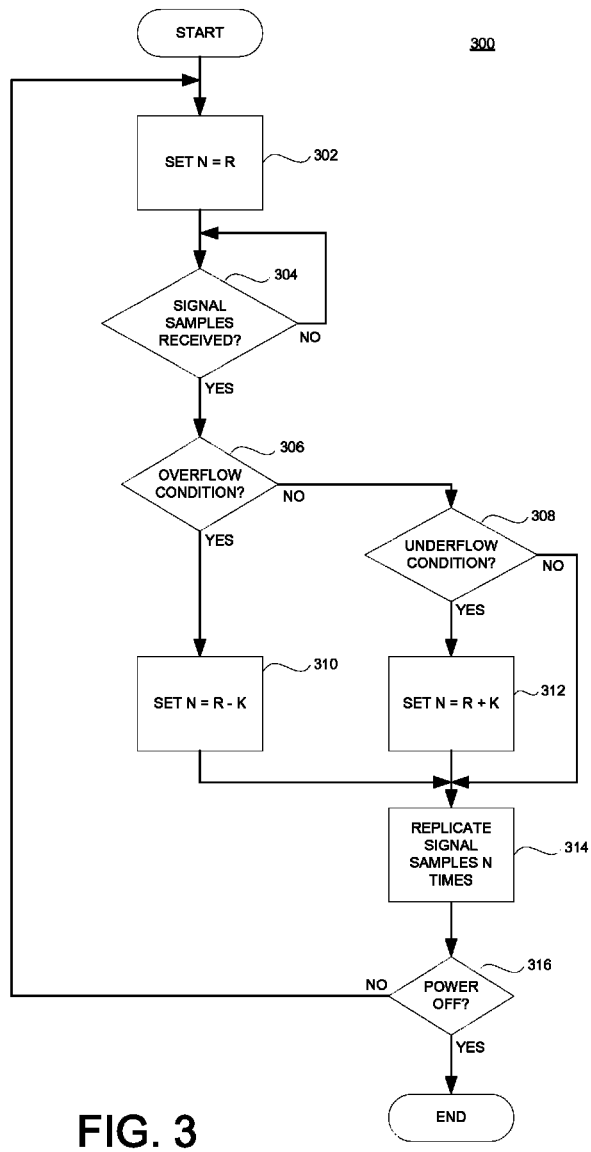
FIG. 3 is a flowchart depicting an example of a signal sample replication process in a receiver.

An example of a signal sample replication process 300 used by the receiver 204 will now be described with respect to the flow chart illustrated in FIG. 3. As shown in FIG. 3, in block 302, an upsampling ratio N is set to a fixed value R. For example, the oversampling circuit 220, as shown in FIG. 2, is initially set to the default fixed upsampling ratio R.

In block 304, a determination is made as to whether audio signal samples are received at, for example, the buffer 216. If the audio signal samples are received, the process proceeds to block 306, otherwise the process continues to check for the audio signal samples at block 304.

In block 306, a determination is made as to whether an overflow condition exists. If an overflow condition exists, the process proceeds to block 310. Otherwise, the process proceeds to block 308. In block 310, the upsampling ratio N is set to (R−k), and the process proceeds to block 314.

In block 308, a determination is made as to whether an underflow condition exists. If an underflow condition exists, the process proceeds to block 312. Otherwise, the process proceeds to block 314. In block 312, the upsampling ratio N is set to (R+k), and the process proceeds to block 314.

In block 314, the process replicates the audio signal samples N times. For example, depending on whether the buffer 210 is in the overflow condition, the underflow condition, or neither condition, the oversampling circuit 220 either replicates the audio signal samples with the sampling ratio set to (R−k), (R+k), or R, respectively.

After block 314, the process proceeds to block 316 where a determination is made as to whether the receiver 204 is powered off. If the receiver 204 is not powered off, the process returns to block 302. Otherwise, the process ends.

Figure 4:
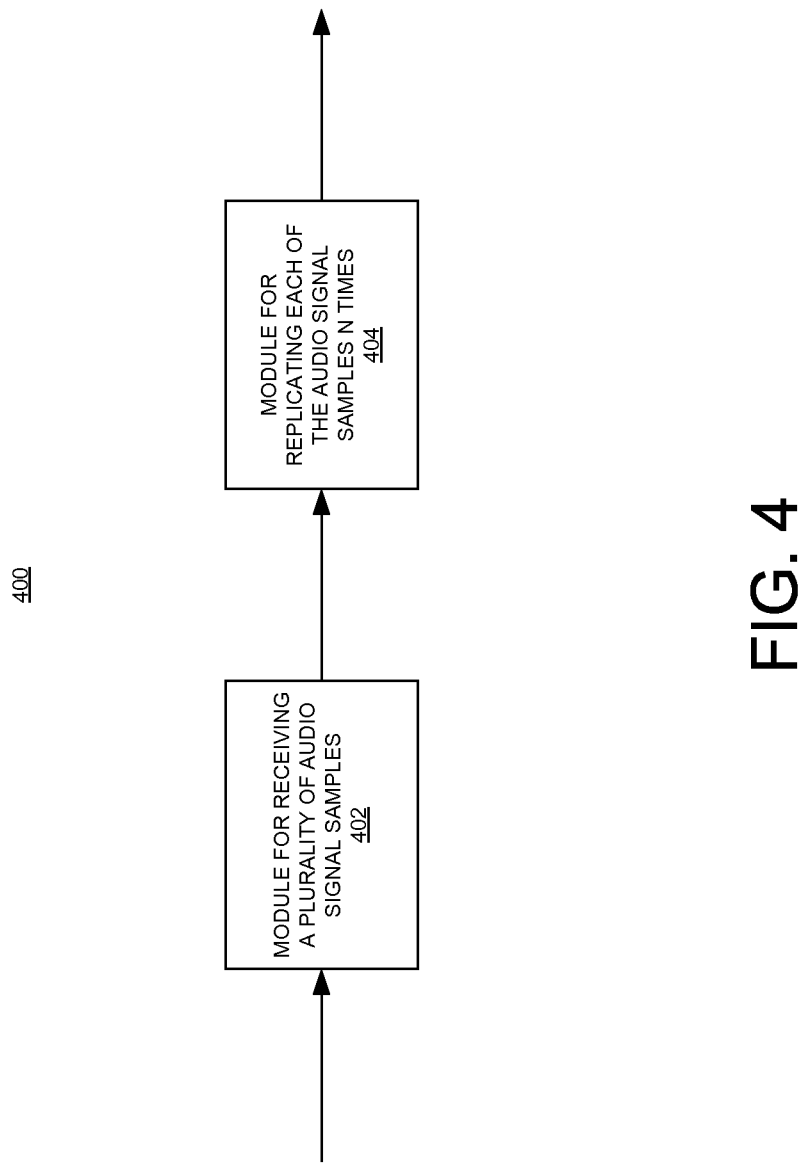
FIG. 4 is a block diagram illustrating an example of the functionality of an apparatus.

FIG. 4 is a block diagram illustrating an example of the functionality of an apparatus. In this example, the apparatus 400 includes a module 402 for receiving a plurality of audio signal samples, and a module 404 for replicating each of the audio signal samples n times, wherein n is variable. The module 402 may be implemented by the wireless interface 214 (see FIG. 2) described above or by some other suitable means. Likewise, the module 404 may be implemented at least by the oversampling circuit 220 described above or by some other suitable means.

The components described herein may be implemented in a variety of ways. For example, an apparatus may be represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof. Such an apparatus may include one or more modules that may perform one or more of the functions described above with regard to various figures.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components.

As noted above, an apparatus may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions described herein may be implemented using any suitable means. Such means also may be implemented, at least in part, using corresponding structure as taught herein. For example, the components described above may be implemented in an "ASIC" and also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for processing signals, comprising:
   an oversampling circuit configured to receive a plurality of audio signal samples from a buffer, the oversampling circuit being further configured to replicate each of the audio signal samples n times, wherein n is variable;
   wherein the oversampling circuit varies n based on signaling received from the buffer that indicates whether the buffer is in an overflow condition or an underflow condition,
   wherein the oversampling circuit maintains n in a fixed state if the buffer is not in an overflow condition and not in an underflow condition, and
   wherein varying n if the signaling indicates that the buffer is in an overflow or underflow condition comprises increasing or decreasing n from the fixed state of n for a number of non-consecutive audio signal samples.

2. The apparatus of claim 1, wherein the buffer is configured to collect the audio signal samples.

3. The apparatus of claim 2, wherein the signaling relates to the number of audio signal samples collected in the buffer.

4. The apparatus of claim 2, wherein the oversampling circuit is further configured to decrease n from the fixed state in response to signaling indicating that the buffer is in an overflow condition.

5. The apparatus of claim 2, wherein the oversampling circuit is further configured to increase n from the fixed state in response to signaling from the buffer indicating that the buffer is in an underflow condition.

6. The apparatus of claim 2, wherein the number of audio signal samples for which n is increased or decreased being is a function of the fixed state of n.

7. The apparatus of claim 2, wherein the number of audio signal samples for which n is increased or decreased is equal to the fixed state of n.

8. The apparatus of claim 2, wherein varying n when the signaling indicates that the buffer is in an overflow or underflow condition comprises increasing or decreasing n from the fixed state of n for a number of consecutive audio signal samples.

9. The apparatus of claim 2, wherein the number of audio signal samples for which n is increased or decreased is a function of the amount that n is increased or decreased from the fixed state of n.

10. The apparatus of claim 1, further comprising an audio decoder configured to decode the audio signal samples.

11. The apparatus of claim 1, further comprising a digital-to-analog converter configured to drive a load in response to the replicated audio signal samples output from the oversampling circuit.

12. The apparatus of claim 11, wherein the load comprises an audio speaker.

13. An apparatus for processing signals, comprising:
    an oversampling circuit configured to receive a plurality of audio signal samples, the oversampling circuit being further configured to replicate each of the audio signal samples n times, wherein n is variable;
    a buffer configured to:
      provide the audio signal samples to the oversampling circuit, and
      signal the oversampling circuit, wherein the signaling indicates whether the buffer is in an overflow or underflow condition;
    wherein the oversampling circuit is further configured to vary n as a function of the signaling from the buffer,
    wherein n is in a fixed state if the buffer is not in an overflow or underflow condition, and
    wherein the oversampling circuit is further configured to increase or decrease n from the fixed state of n for a number of non-consecutive audio signal samples in response to signaling from the buffer indicating that the buffer is in an overflow or underflow condition.

14. A method for processing signals, comprising:
    receiving a plurality of audio signal samples at a circuit from a buffer;
    replicating each of the audio signal samples n times at the circuit, wherein n is variable;
    varying n if signaling received from the buffer indicates that the buffer is in an overflow condition or in an underflow condition; and
    maintaining n in a fixed state if the buffer is not in the overflow condition or in the underflow condition,
    wherein varying n comprises increasing or decreasing n from the fixed state of n for a number of non-consecutive audio signal samples.

15. The method of claim 14, wherein the signaling relates to the number of audio signal samples in the buffer.

16. The method of claim 14, further comprising decreasing n from the fixed state in response to the signaling received from the buffer indicating that the buffer is in the overflow condition.

17. The method of claim 14, further comprising increasing n from the fixed state in response to the signaling received from the buffer indicating that the buffer is in the underflow condition.

18. The method of claim 17, wherein the number of audio signal samples for which n is increased or decreased being from the fixed state of n is a function of the fixed state of n.

19. The method of claim 14, wherein the number of audio signal samples for which n is increased or decreased from the fixed state of n is equal to the fixed state of n.

20. The method of claim 14, wherein varying n comprises increasing or decreasing n from the fixed state of n for a number of consecutive audio signal samples in response to signaling from the buffer indicating that the buffer is in an overflow or underflow condition.

21. The method of claim 14, wherein the number of audio signal samples for which n is increased or decreased is a function of the amount that n is increased or decreased from the fixed state of n.

22. The method of claim 14, further comprising decoding the audio signal samples.

23. The method of claim 14, further comprising driving a load in response to the replicated audio signal samples output from the circuit.

24. The method of claim 23, wherein the load comprises an audio speaker.

25. A method for processing signals, comprising:
receiving a plurality of audio signal samples at a circuit via a buffer;
replicating each of the audio signal samples n times at the circuit, wherein n is variable;
signaling the circuit via the buffer, the circuit being configured to vary n as a function of the signaling from the buffer, wherein the signaling indicates whether the buffer is in an overflow or underflow condition, and wherein n is in a fixed state if the buffer is not in an overflow or underflow condition; and
increasing or decreasing n from the fixed state of n for a number of non-consecutive audio signal samples in response to signaling from the buffer indicating that the buffer is in an overflow or underflow condition.

26. An apparatus for processing signals, comprising:
buffering means for collecting audio signal samples;
receiving means for receiving a plurality of audio signal samples from the buffering means; and
oversampling means for replicating each of the audio signal samples n times, wherein n is variable,
wherein the oversampling means is further for varying n if signaling received from the buffering means indicates that the buffering means is in an overflow condition or in an underflow condition; and
wherein the oversampling means maintains n in a fixed state if the buffering means is not in the overflow condition or in the underflow condition,
wherein the oversampling means varies n by increasing or decreasing n from the fixed state of n for a number of non-consecutive audio signal samples.

27. The apparatus of claim 26, wherein the signaling relates to the number of audio signal samples in the buffering means.

28. The apparatus of claim 26, wherein the oversampling means decreases n from the fixed state in response to signaling indicating that the buffering means is in an overflow condition.

29. The apparatus of claim 26, wherein the oversampling means increases n from the fixed state in response to signaling from the buffering means indicating that the buffering means is in an underflow condition.

30. The apparatus of claim 26, wherein the number of audio signal samples for which n is increased or decreased is a function of the fixed state of n.

31. The apparatus of claim 26, wherein the number of audio signal samples for which n is increased or decreased is equal to the fixed state of n.

32. The apparatus of claim 26, wherein the oversampling varies n by increasing or decreasing n from the fixed state of n for a number of consecutive audio signal samples.

33. The apparatus of claim 26, wherein the number of audio signal samples for which n is increased or decreased is a function of the amount that n is increased or decreased from the fixed state of n.

34. The apparatus of claim 26, further comprising means for decoding the audio signal samples.

35. The apparatus of claim 26, further comprising means for driving a load in response to the replicated audio signal samples output from the oversampling means.

36. The apparatus of claim 35, wherein the load comprises an audio speaker.

37. An apparatus for processing signals, comprising:
receiving means for receiving a plurality of audio signal samples;
oversampling means for replicating each of the audio signal samples n times, wherein n is variable;
buffering means for providing the audio signal samples to the oversampling means and for signaling the oversampling means, the oversampling means being further for varying n as a function of the signaling from the buffering means,
wherein the signaling relates to the number of audio signal samples in the buffering means,
wherein the signaling indicates whether the buffering means is in an overflow or underflow condition,
wherein n is in a fixed state if the buffering means is not in an overflow or underflow condition, and
wherein the oversampling means is further for increasing or decreasing n from the fixed state of n for a number of non-consecutive audio signal samples in response to signaling from the buffering means indicating that the buffering means is in an overflow or underflow condition.

38. A computer program product for processing signals, comprising:
a computer-readable medium comprising instructions executable to:
receive a plurality of audio signal samples from a buffer;
replicate each of the audio signal samples n times, wherein n is variable;
vary n if signaling received from the buffer indicates that the buffer is in an overflow condition or in an underflow condition; and
maintain n in a fixed state if the buffer is not in the overflow condition or in the underflow condition,
wherein varying n comprises increasing or decreasing n from the fixed state of n for a number of non-consecutive audio signal samples.

39. A headset comprising:
an oversampling circuit configured to receive a plurality of audio signal samples from a buffer, the oversampling circuit being further configured to replicate each of the audio signal samples n times, wherein n is variable; and
a transducer configured to provide an audible output based on the audio signal samples,
wherein varying n comprises increasing or decreasing n for a number of non-consecutive audio signal samples if signaling received from the buffer indicates that the buffer is in an overflow condition or in an underflow condition.

* * * * *